Aug. 25, 1925.
F. LÓPEZ
CHAIN BICYCLE
Filed Feb. 6, 1925
1,551,412
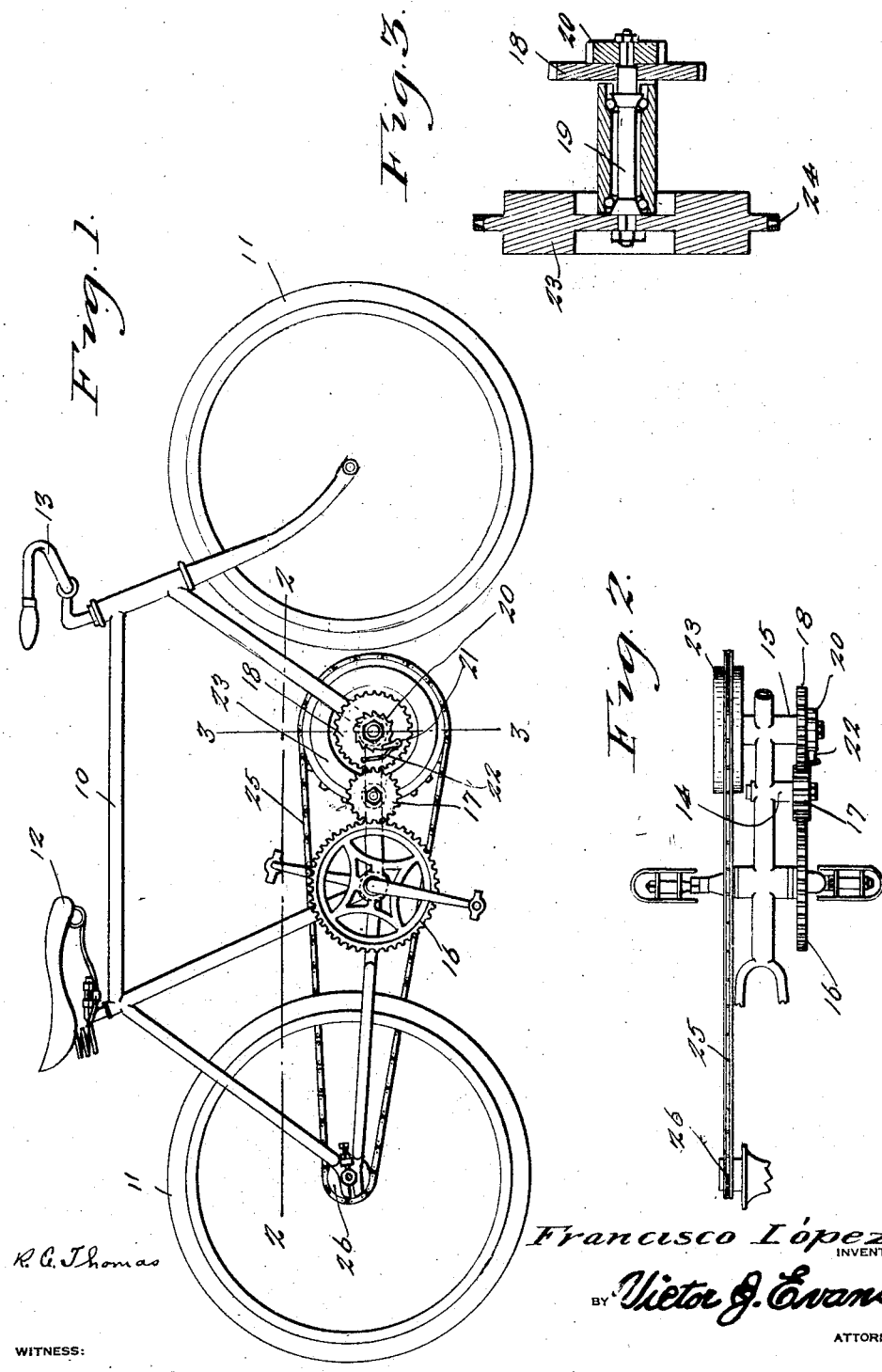
Francisco López
INVENTOR Patented Aug. 25, 1925.

1,551,412

UNITED STATES PATENT OFFICE.

FRANCISCO LÓPEZ, OF PORT ARTHUR, TEXAS.

CHAIN BICYCLE.

Application filed February 6, 1925. Serial No. 7,379.

*To all whom it may concern:*

Be it known that I, FRANCISCO LÓPEZ, citizen of the Republic of Mexico, residing at Port Arthur, No. 130 E. Sixteenth Street, in the county of Jefferson and State of Texas, have invented new and useful Improvements in Chain Bicycles, of which the following is a specification.

This invention relates to improvements in bicycles and contemplates the provision of a novel form of propelling means whereby the operator is permitted to stop working the pedals in order to allow the bicycle to move upon its own power owing to the novel form of gearing means arranged and in communication with the pedals.

Another object of the invention is to provide a gear upon the intermediate portions of the pedals which in turn is meshed with a pawl and ratchet which in turn rotates a weighted fly-wheel which owing to the force of momentum obtained from the successive revolutions thereof will cause the bicycle to move forwardly at a great rate of speed while the pedals are idle.

With the above and other objects in view, the invention further includes the following novel features and details of construction, to be hereinafter more fully described, illustrated in the accompanying drawing, and pointed out in the appended claims.

In the drawing:—

Figure 1 is a side elevation of a bicycle having a novel form of propelling means attached thereto.

Figure 2 is a longitudinal section taken on line 2—2 of Figure 1.

Figure 3 is a vertical sectional view taken through the propelling means per se.

Referring to the drawing in detail, wherein like characters of reference denote corresponding parts, the reference character 10 indicates the frame of a bicycle, 11 the wheels, 12 the seat and 13 the handle bars, all of which are of the usual and well known construction and form no part of the present application for Letters Patent.

In the bicycle frame 10 it is deemed necessary to make such changes therein for the mounting of the propelling means for the bicycle and which includes a sleeve like member 14 which extends to one side of and forwardly of the usual pedal bearing and a correspondingly shaped bearing member 15 is provided in advance of the sleeve 14 and which extends transversely of the frame 10 in the same manner with the sleeve 14 and the pedal bearing.

I deem it necessary in the construction of this device to provide a gear wheel 16 in place of the usual sprocket wheel and which meshes with a relatively small idler gear 17 arranged upon the outer end of the sleeve 14 and which in turn is meshed with a slightly larger idler gear 18 arranged upon the outer side of the bearing 15, arranged adjacent the outer end of a bearingly mounted shaft 19 arranged within the bearing 15. Fixed to this end of the shaft 19 is a ratchet gear 20 which has a pawl 21 engaging therewith which has its opposite end pivoted to the outer side of the idler gear 18 which is held in engagement therewith through the instrumentality of a substantially offset spring finger 22 arranged upon the outer face of the idler gear 18 and having its opposite free end portion lying flush with the outer side of the pawl 21 whereby the said pawl will be held in engagement with the ratchet gear 20 in order that the said ratchet wheel 20 may turn simultaneously with the idler gear 18 when propelled by the pedal gear 16.

The opposite end of the shaft 19 has fixed thereon a fly-wheel 23 which includes sprocket teeth 24 arranged centrally and upon the upper periphery thereof and which is adapted to receive thereon a bicycle chain 25 which is also passed over a rear wheel sprocket 26.

In the mode and operation of the present invention as understood from the foregoing description and accompanying drawing, it is to be inferred that upon the revolutions or rotations of the sprocket gear 16 that the idler gear 17 will be rotated counter-clockwise and which owing to its meshing with the gear 18 freely mounted adjacent one end of the shaft 19 will be caused to rotate in a clockwise movement and upon such revolutions will also cause the ratchet gear 20 and fly-wheel 23 to turn in the same direction therewith owing to the pawl and ratchet arrangement upon the outer side of the freely mounted gear 18 which has secured to the outer side thereof a pawl 21 and spring 22 which holds the same in direct engagement with the ratchet gear 20 whereby the operator may stop working the pedals on the pedal gear 16 after he has revolved the same several turns and then rest while the bicycle is propelled through the momentum given to the fly-wheel 23 which in turn will cause the bicycle to move at a great rate of speed, and also act as a coaster brake.

The invention is susceptible of various changes in its form, proportions and minor details of construction, and the right is herein reserved to make such changes as properly fall within the scope of the appended claims.

Having described my invention what is claimed is:

1. A bicycle of the character described comprising a pedal gear, a pair of aligned counter-clockwise and clockwise mounted idler gears arranged for rotation with the pedal gear, said clockwise idler gear being freely mounted adjacent the outer end portion of a transversely extending shaft member, a fly wheel mounted upon the opposite end of the shaft member, and a pawl and ratchet means included upon the opposite end of the shaft member and connected with the clockwise idler gear whereby the fly-wheel when connected with the rear wheel of the bicycle will impart momentum to the bicycle and also act as a coaster brake.

2. A bicycle of the character described comprising a pedal gear mounted upon one side of the bicycle frame, a relatively small counter-clockwise idler gear arranged forwardly and in alignment with the sprocket gear, a transversely extending bearing sleeve provided in the frame, a bearingly mounted shaft member arranged within the sleeve, a geared fly-wheel carried upon the inner end of the shaft member, a clockwise idler gear freely mounted adjacent the opposite end of the shaft, a ratchet gear fixed to this end of the shaft, a spring tensioned pawl included upon the outer face of the clockwise idler gear and engaging the ratchet gear, and a chain passing over the rear wheel sprocket and the geared fly-wheel whereby the bicycle may be propelled a short distance and then rendered as a coaster-brake and be moved along by the momentum of the force imparted to and by the fly-wheel.

In testimony whereof I affix my signature.

FRANCISCO LÓPEZ.